(12) United States Patent
Babazadeh et al.

(10) Patent No.: US 10,050,530 B2
(45) Date of Patent: Aug. 14, 2018

(54) METHOD AND APPARATUS FOR CONTROL ADAPTATION IN RESONANT-TAPPED INDUCTOR CONVERTERS

(71) Applicant: Infineon Technologies Americas Corp., El Segundo, CA (US)

(72) Inventors: Amir Babazadeh, Laguna Hills, CA (US); Venkat Sreenivas, Winchester, MA (US)

(73) Assignee: Infineon Technologies Americas Corp., El Segundo, CA (US)

(*) Notice: Subject to any disclaimer, the term of this patent is extended or adjusted under 35 U.S.C. 154(b) by 1 day.

(21) Appl. No.: 15/363,880

(22) Filed: Nov. 29, 2016

(65) Prior Publication Data

US 2018/0152104 A1 May 31, 2018

(51) Int. Cl.
| | |
|---|---|
| *H02M 3/158* | (2006.01) |
| *H02M 1/084* | (2006.01) |
| *H02M 1/14* | (2006.01) |
| *H02M 1/00* | (2006.01) |

(52) U.S. Cl.
CPC ........... *H02M 3/158* (2013.01); *H02M 1/084* (2013.01); *H02M 1/14* (2013.01); *H02M 2001/0009* (2013.01)

(58) Field of Classification Search
CPC .... H02M 3/156–3/158; H02M 3/1588; H02M 5/293; H02M 1/083; G01R 19/0084
USPC .......... 323/224, 234, 235, 271, 282
See application file for complete search history.

(56) References Cited

U.S. PATENT DOCUMENTS

| | | | | |
|---|---|---|---|---|
| 6,590,366 | B1 * | 7/2003 | Browning | F16C 32/0451 310/90.5 |
| 7,772,811 | B1 * | 8/2010 | Jain | H02M 3/157 323/224 |
| 2015/0115911 | A1 * | 4/2015 | Parto | H02M 3/158 323/271 |

* cited by examiner

*Primary Examiner* — Yemane Mehari
(74) *Attorney, Agent, or Firm* — Murphy, Bilak & Homiller, PLLC

(57) ABSTRACT

A semi-resonant voltage converter has a synchronous rectification (SR) switch through which a half-cycle sinusoidal-like current is conducted when turned on. An embodiment of a method of controlling operation of the semi-resonant voltage converter includes switching the SR switch and other switches of the semi-resonant voltage converter via a linear controller so as to supply output power to a load, the semi-resonant voltage converter having a DC gain that increases when load current increases, and scaling downward an output of the linear controller used to control the switching of the SR switch responsive to the load current exceeding a first threshold, so as to at least partly counteract an increase in the DC gain of the semi-resonant voltage converter. Other control adaptation methods are also described.

20 Claims, 8 Drawing Sheets

METHOD AND APPARATUS FOR CONTROL ADAPTATION IN RESONANT-TAPPED INDUCTOR CONVERTERS

TECHNICAL FIELD

The present application relates to multi-phase semi-resonant and resonant converters and, in particular, relates to techniques for control adaptation for such converters.

BACKGROUND

Resonant and semi-resonant DC-DC converters, including isolated and non-isolated topologies, are used in a variety of applications including telecommunications, consumer electronics, computer power supplies, etc. The usage of such converters is gaining popularity because of their zero-voltage switching (ZVS) and/or zero-current switching (ZCS) characteristics, and their ability to utilize parasitic electrical properties inherent in an electronic circuit. Among numerous topologies, the semi-resonant converter with transformer/tapped inductor is an attractive topology for providing high voltage-conversion ratios without requiring isolation. Such converters provide advantages including lower cost and higher efficiency as compared to other solutions.

One class of semi-resonant converters includes high-side and low-side switches that transfer power from an input source to a tapped inductor that supplies output power to a load. The tapped inductor is also connected to a second low-side switch, which is termed a synchronous rectification (SR) switch herein. In order to meet the power requirements for a load of a semi-resonant converter (e.g., provide a near constant output voltage for the load), many semi-resonant DC-DC converters employ a variable switching frequency wherein the switching period can vary from cycle to cycle. During a portion of each switching period, the SR switch will be enabled such that current flows through it. For the semi-resonant converter described above, the current during this portion of a switching period will be shaped like one half cycle of a sinusoidal period. The time interval for this half-cycle sinusoid is determined by reactive elements within passive circuitry of the semi-resonant converter, e.g., the natural frequency of an inductor/capacitor (LC) resonant tank and other passive components within the semi-resonant DC-DC converter determine this time interval. As such, each phase has its own natural frequency.

It is highly desirable to turn the power switches of a resonant or semi-resonant DC-DC converter on and off when the voltage or current across the relevant switch is at or near zero. Such soft switching has an advantage that switch losses are minimized. Additionally, soft switching avoids electromagnetic interference (EMI) that is due to high-frequency harmonics associated with hard switching. An important consequence of these advantages is that soft-switching resonant and semi-resonant converters can run at much higher efficiencies than their corresponding hard-switching counterparts. However, the transfer function can change under different conditions such as changing load, input voltage, output voltage, etc. which can result in non-linear behaviour.

Accordingly, there is a need for improved control adaptation techniques which mitigate non-linear behaviour in resonant or semi-resonant DC-DC converter that use synchronous rectification (SR) switches.

SUMMARY

According to an embodiment of a method of operating a semi-resonant voltage converter having a synchronous rectification (SR) switch through which a half-cycle sinusoidal-like current is conducted when turned on, the method comprises: switching the SR switch and other switches of the semi-resonant voltage converter via a linear controller so as to supply output power to a load, the semi-resonant voltage converter having a DC gain that increases when load current increases; and scaling downward an output of the linear controller used to control the switching of the SR switch responsive to the load current exceeding a first threshold, so as to at least partly counteract an increase in the DC gain of the semi-resonant voltage converter.

According to an embodiment of a method of operating a semi-resonant voltage converter having a synchronous rectification (SR) switch through which a half-cycle sinusoidal-like current is conducted when turned on, the method comprises: controlling switching of the SR switch via an output of a PID (proportional-integral-derivative) controller so as to supply output power to a load; applying a feed-forward adjustment value to the output of the PID controller, the feed-forward adjustment value designed to settle the integral term of the PID controller if the integral term begins to deviate from a nominal value; and scaling upward the feed-forward adjustment value responsive to the load current exceeding the first threshold or another threshold, so as to force the integral term of the PID controller to settle faster.

According to an embodiment of a method of operating a semi-resonant voltage converter having a synchronous rectification (SR) switch through which a half-cycle sinusoidal-like current is conducted when turned on, the method comprises: switching the SR switch and other switches of the semi-resonant voltage converter via a linear controller so as to supply output power to a load, the linear controller comprising an adaptive voltage positioning (AVP) filter for providing output voltage droop compensation; and reducing a bandwidth of the AVP filter responsive to the load current exceeding the first threshold or another threshold, so as to reduce oscillations in the output voltage.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description that follows.

DETAILED DESCRIPTION

Embodiments described herein provide control adaption techniques for mitigating non-linear control behaviour in resonant and semi-resonant voltage converters that use synchronous rectification (SR) switches through which a half-cycle sinusoidal-like current is conducted when turned on. SR switches are included in a power converter topology having a transformer/tapped inductor (hereinafter referred to simply as a—tapped inductor), and are used for coupling the transformer/tapped inductor to ground. Such a topology allows for high voltage-conversion ratios without requiring isolation. Because of its ability to support high voltage-conversion ratios, this topology is particularly appropriate for applications requiring an output power supply that provides a relatively low voltage and a relatively high current. The techniques described below ensure eliminate or at least reduce non-linear behaviour. The techniques include load-based rescaling of PID (proportional-integral-derivative), feed-forward and AVP (adaptive voltage positioning) filters, and using a band stop (notch) filter to roll off the gain at high frequencies with very low effects on the phase margin.

Various embodiments of multi-phase voltage converter circuits and methods within multi-phase voltage converters will be provided in the following detailed description and the associated figures. The described embodiments provide particular examples for purposes of explanation, and are not meant to be limiting. Features and aspects from the example embodiments may be combined or re-arranged except where the context does not allow this.

Figure 1:
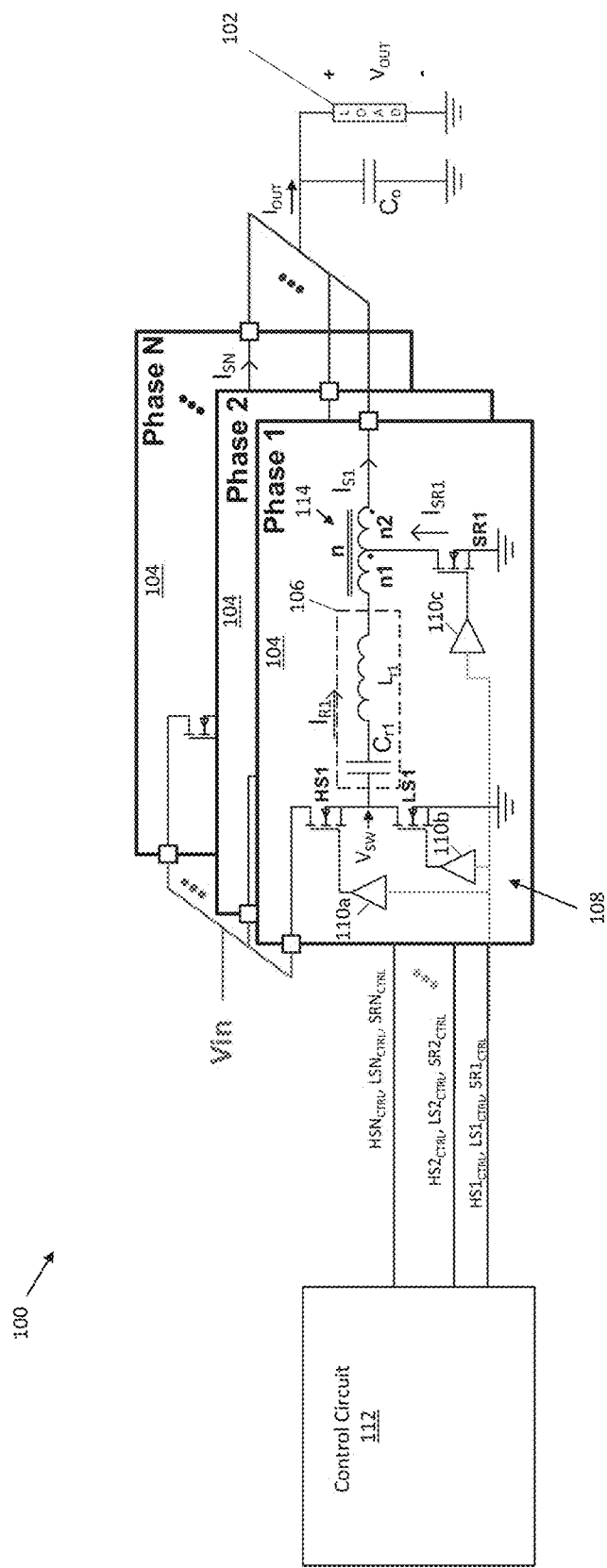
FIG. 1 illustrates a block diagram of an embodiment of a multi-phase voltage converter including a control circuit, wherein each phase includes a power stage, a passive circuit, and a synchronous rectification (SR) switch.

FIG. 1 illustrates an embodiment of a multi-phase voltage converter 100 that is configured to input power from a power source $V_{IN}$ and output power for driving a load 102. The voltage converter 100 supplies a current $I_{OUT}$ to the load 102 and to a capacitor $C_O$ that serves to filter an output voltage $V_{OUT}$. The voltage converter 100 of FIG. 1 includes multiple phases 104. Phase 1, which is taken as representative of the multiple phases, is illustrated in block diagram form with the understanding that the other phases would be similarly configured.

As illustrated, phase 1 includes a passive circuit 106 that couples a power stage 108 to the voltage converter output $V_{OUT}$. The power stage 108 inputs switch control signals $HS1_{CTRL}$ and $LS1_{CTRL}$ for controlling switches HS1, LS1 therein. The switches HS1, LS1 within the power stage 108 typically require drivers 110*a*, 110*b*. The passive circuit 106 is coupled to a synchronous rectification (SR) switch SR1, which serves to switchably couple the passive circuit 106 to ground. The SR switch SR1 also typically requires a driver 110*c*.

A control circuit 112 controls the switches HS1, LS1 of the power stage 108 and the SR switch SR1 for each of the phases 104 of the voltage converter 100. The control circuit 112 determines a switching frequency for the voltage converter 100 based upon the load requirements, and drives switch control signals (e.g., $HS1_{CTRL}$, $LS1_{CTRL}$, $SR1_{CTRL}$) for each of the phases 104 of the voltage converter 100. Control is applied to switch HS1 of the power stage 108. Switch LS1 of the power stage 108 and the SR switch SR1 operate based on zero cross detection or a fixed off time. This means that changing the on time which is applied to switch HS1 does not affect SR timing. The control signals generated by the control circuit 112 are typically pulse-width-modulated (PWM) waveforms, each of which is driven with a frequency and duty cycle determined by the control circuit 112 based upon the requirements of the load 102. The switching frequency is variable and changes as the load requirements change.

The control circuit 112 may be implemented using analog hardware components (such as transistors, amplifiers, diodes, and resistors), may be implemented using processor circuitry including primarily digital components, or may be implemented using a combination of analog hardware components and processor circuitry. The processor circuitry may include one or more of a digital signal processor (DSP), a general-purpose processor, and an application-specific integrated circuit (ASIC). The control circuit 112 may also include memory, e.g., non-volatile memory such as flash, that includes instructions or data for use by processor circuitry. The control circuit 112 inputs several sensor signals e.g., $I_{OUT}$, $V_{OUT}$, current measurements for the SR switches of each phase 104 to estimate the power requirements for the load 102 and to otherwise aid in the generation of the switch control signals.

In order to maintain stability and reduce ripple at the output of the voltage converter 100, the multiple phases 104 of the voltage converter 100 are typically driven using the same switching frequency during a switch cycle of the voltage converter 100. The control circuit 112 determines the load requirements at a given point in time. Based upon these load requirements and, possibly, the switching frequency for the current cycle, the control circuit 112 will determine a switching frequency (and associated time period) for an upcoming (next) cycle. For a given phase 104 of the voltage converter 100, this upcoming switch frequency (and associated time period) is used to generate the PWM waveforms for each of the switches in the given phase 104 (e.g., $HS1_{CTRL}$, $LS1_{CTRL}$, $SR1_{CTRL}$) for the upcoming switch cycle. Versions of these PWM waveforms that are delayed (staggered) in time are used to drive the switches in the other phases of the voltage converter 100 for the upcoming switch cycle. The control circuit 112 repeats this process for each switch cycle. Techniques for determining the switching frequency and duty cycles based upon the load requirements of a voltage converter are, generally, well-known in the art. Such conventional techniques will not be further elaborated upon herein, in order to avoid obfuscating the unique aspects of the invention, which are described.

Operation of phase 1 of the voltage converter 100 is described next in more detail. Input voltage $V_{IN}$ is input to the power converter 100 at a high-side switch HS1 which is coupled to a low-side switch LS1 at a switching node $V_{SW}$. The low-side switch LS1 is, in turn, connected to ground. Each of these switches HS1, LS1 is controlled by a respective driver 110*a*, 110*b* as shown. The switching node $V_{SW}$ is coupled to the passive circuit 106, which provides an output current $I_{S1}$ and voltage $V_{OUT}$ to a load 102. The passive circuit 106 includes a resonant tank comprised of a capacitor $C_{Rr1}$ and an inductor $L_{r1}$. The inductor $L_{r1}$ may merely be the leakage inductance (e.g., the inherent parasitic inductance of the circuit wiring), or it may be an actual inductor component together with the leakage inductance. Moreover, the inductance represented by $L_{r1}$ is typically variable, because the inductance value will often vary over temperature. The inductor $L_{r1}$ is coupled to a transformer/tapped inductor 114 having n1 primary-side windings and n2 secondary-side windings. The turns ratio n2/n1 determines the output/input voltage ratio of the transformer/tapped inductor 114 when it is conducting current. Conversely, the ratio n1/n2 determines the output/input current ratio of the transformer/tapped inductor 114. A magnetizing inductor $L_M$ is connected across the transformer/tapped inductor 114. The SR switch SR1 is connected to the transformer/tapped inductor 114 and serves to couple its center tap to ground when the SR switch SR1 is conducting.

The high-side, low-side, and SR switches HS1, LS1, SR1 are shown in FIG. 1 as enhancement-mode metal-oxide semiconductor field-effect transistors (MOSFETs), but other switch devices may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. The high-side, low-side, and SR switches HS1, LS1, SR1 may be integrated on the same semiconductor die, may each be provided on separate dies, or may otherwise be spread across a plurality of semiconductor dies. The drivers 110*a*, 110*b*, 110*c* for the high-side, low-side, and SR switches HS1, LS1, SR1 may be integrated on the same semiconductor die(s) as their corresponding switches, or may be provided on separate dies.

The control circuit 112 generates PWM signals $HS1_{CTRL}$, $LS1_{CTRL}$, and $SR1_{CTRL}$ that are coupled to the respective drivers 110*a*, 110*b*, 110*c* that control high-side, low-side, and SR switches HS1, LS1, SR1 for the illustrated phase. The control circuit 112 determines the frequency and duty cycle of the PWM signals $HS1_{CTRL}$, $LS1_{CTRL}$, and $SR1_{CTRL}$ so as to meet the power requirements of the load 102. In a semi-resonant voltage converter such as that illustrated in FIG. 1, the high-side and low-side switches HS1, LS1 of the power stage 108 are controlled such that these switches do not conduct at the same time. A typical switching cycle of the voltage converter phase 104 begins with a "dead time" during which none of the switches HS1, LS1, SR1 are conducting. This is followed by a "$T_{ON}$" period during which the high-side switch HS1 is conducting, but the low-side switch LS1 and the SR switch SR1 are not conducting. A "$T_{OFF}$" period follows this, during which the high-side switch $Q_{HS}$ HS1 not conducting, but the low-side switch LS1 and the SR switch SR1 are conducting.

Figure 2:
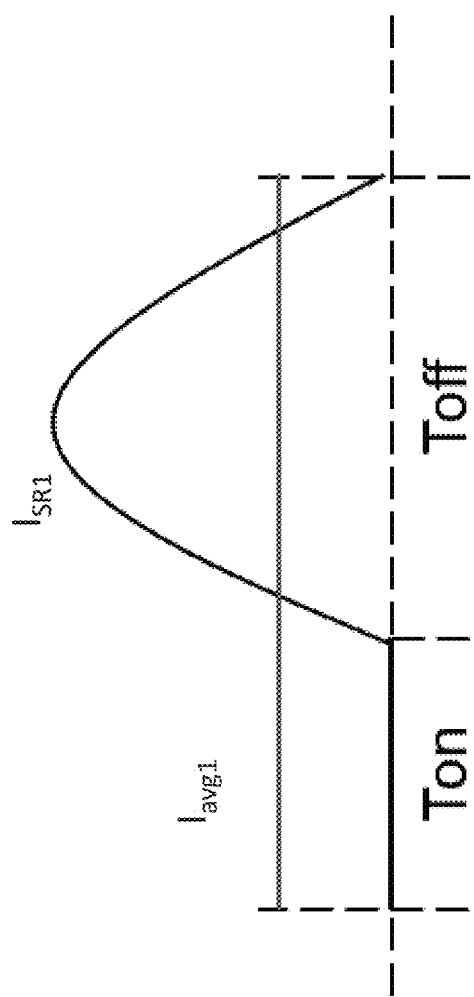
FIG. 2 illustrates a functional diagram of the half-cycle sinusoidal-like current through the SR switch in FIG. 1.

FIG. 2 illustrates the current through SR switch SR1 when turned on. The DC average $I_{avg1}$ of the SR1 switch current $I_{SR1}$ is also shown in FIG. 2. For sake of simplicity, tristate time is not shown in FIG. 2 when all switches HS1, LS1, SR1 are not conducting. For best efficiency, SR switch SR1 should be switched off when $I_{SR1}$ crosses zero i.e. zero current switching. The control circuit 112 can sense either the output current IS1 of the phase 104 or the current $I_{SR1}$ through SR switch SR1 to determine the zero crossing instant. The control circuit 112 controls the ON time to regulate the output voltage as given by:

$$V_{OUT}=V_{IN}*D/n \quad (1)$$

where D is the duty cycle and n is the turns ratio of the transformer/tapped inductor 114. The OFF time, for best efficiency, is based on the resonant capacitor $C_{Rr1}$ and inductor $L_{r1}$.

For a given phase, 104 current flows through its SR switch, e.g., SR1, when the SR switch is conducting. The PWM control signal $SR1_{CTRL}$ for SR switch SR1 determines when that SR switch conducts. The PWM control signal $SR1_{CTRL}$ only enables corresponding SR switch SR1 during the off interval ("$T_{OFF}$") of the high-side switch HS1 for the phase 104. In FIG. 2, this corresponds to the time interval when the high-side control signal $HS1_{CTRL}$ is low.

The currents flowing through the SR switches SR1, SR2, SRN take on the shape of the upper half cycle of a sinusoid. This is readily seen in FIG. 2 for the current $I_{SR1}$ that flows through SR switch SR1 for phase 1 of the voltage converter 100. For each cycle (e.g., k−1, k), the half-cycle sinusoidal-like current returns to zero at the beginning of the dead-time interval that immediately precedes the rising edge of the high-side PWM control signal $HS1_{CTRL}$. The rising edge of the high-side PWM control signal $HS1_{CTRL}$ signifies the start of the next cycle (e.g., k, k+1) of the voltage converter 100. Again, for ease of illustration, the "dead time" is not shown in FIG. 2, but it is understood that the PWM control signal $SR1_{CTRL}$ would actually disable the current $I_{SR1}$ at the start of a dead time interval during which none of the switches are conducting.

The control circuit 112 of the voltage converter 100 adjusts the PWM signal timings, e.g., $HS1_{CTRL}$, $LS1_{CTRL}$, $SR1_{CTRL}$, so that the SR switch SR1 of phase 1 is turned off at approximately the time when the current $I_{SR1}$ flowing through SR switch SR1 is zero. The control circuit 1112 may determine these timings using a measurement/estimation of the current $I_{SR1}$ as input to a current sampler included in or associated with the control circuit 112. For example, the current $I_{SR1}$ may be measured by using the effective on-state resistance ($R_{dson}$) of SR switch SR1 and the voltage across SR switch SR1, or by using a current mirror. The current measurement, for $I_{SR1}$ or otherwise, may also be accomplished by using other standard means such as measuring the voltage across a sensing resistor, or by using direct current sensing (DCR) techniques.

The interval during which the half-cycle sinusoidal-like current $I_{SR1}$ is positive is determined by the components in the passive circuit 106 of phase 1 of the voltage converter 200, e.g., the values of the LC resonant tank given by $C_{r1}$, $L_{r1}$ of the transformer/tapped inductor 114. Stated alternatively, the components of the passive circuit 106 have a resonant (natural) frequency that determines the time interval corresponding to the positive half-cycle sinusoidal current $I_{SR1}$. While this time interval may be calculated based on the component values, the component values will vary from circuit-to-circuit and, additionally, will vary according to the operating conditions (e.g., temperature) of the voltage converter 100. Hence, an empirical technique employed by the control circuit 112 that makes use of a measurement of $I_{SR1}$, as described above, is preferred.

Unlike other switching converters, the topology illustrated in FIG. 1 can demonstrate nonlinear behaviors at different operating points. The control circuit 112 adjusts its operation to mitigate nonlinearities and maintain high performance for a wide range of operation. In more detail, the conversion ratio of the converter 100 as a function of input voltage $V_{IN}$, output voltage $V_{OUT}$, duty cycle D=Ton/Tsw and load current is given by:

$$M(Io) = \frac{V_o}{V_{in}} = \frac{D}{n} f(Io) \quad (2)$$

where Tsw is the measured switching period. D can be defined as the duty cycle at no load. Ton increases if Io increases, and then Tsw=Ton+Toff also increases given that Toff is almost fixed.

The control circuit 112 may adjust one or more of the following load-dependent parameters based on the load current value/estimate:

DC gain (duty cycle to the output voltage), which may cause instability and oscillations at higher load currents and degrade converter performance in transient events;

Total ripple current, which may introduce ripple to the overall control loop through the AVP (adaptive voltage positioning) loop and add jitter to the PWM control signals and therefore result in higher voltage ripple; and Integrator of a PID (proportional-integral-derivative) type controller, which may cause a long tail in transient response.

In addition to these load-dependent parameters, the converter topology illustrated in FIG. 1 has at least one complex pole with very high Q value at the switching frequency, which can limit the overall system bandwidth and therefore degrade load transient performance. There also be some issues at high frequency load transients, because of high Q poles. A standard PID controller even with two poles cannot roll off the gain adequately at high frequencies. The control circuit 112 described herein addresses these problems which can arise in system nonlinearities if left unmitigated.

Figure 3:
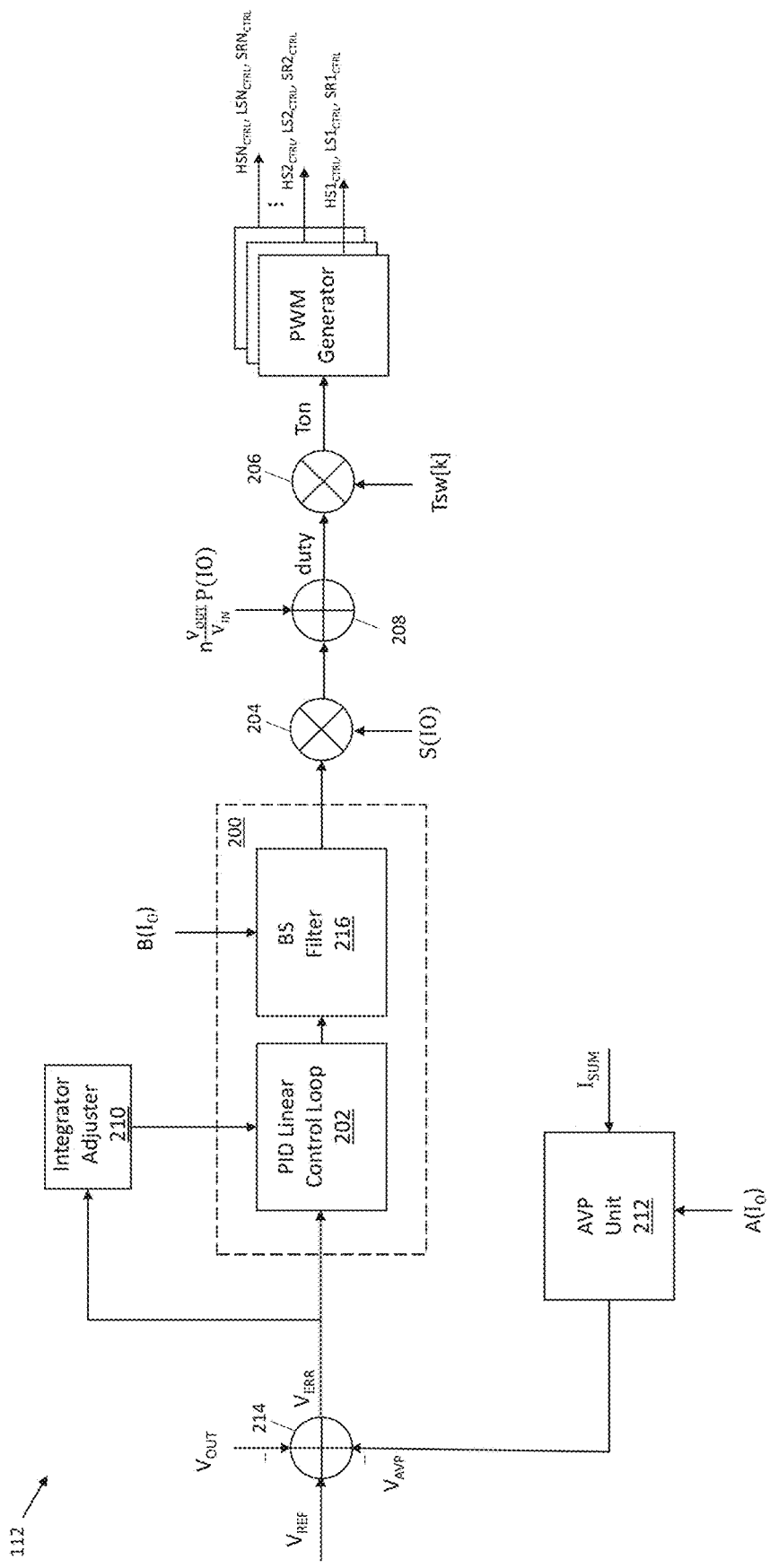
FIG. 3 illustrates an embodiment of a block diagram of the control circuit included in the multi-phase voltage converter of FIG. 1.

FIG. 3 illustrates the control circuit 112 in more detail. The control adaptation techniques implemented by the control circuit and described next can be implemented individually, or in any combination unless explicitly prohibited against.

Part 1: Controller Adaptation Based on the Load

A linear controller 200 included in or associated with the control circuit 112 controls switching of the SR switch for each phase 104 via control signals $SR1_{CTRL}$, $SR2_{CTRL}$, $SRN_{CTRL}$, so as to supply output power to the load 102. As previously described herein, control is applied to switch HSX of each power stage 108. Switch LSX of each power stage 108 and the corresponding SR switch SRX operate based on zero cross detection or a fixed off time. The DC gain from the duty cycle ('duty') to the output of the converter 100 increases with increasing load. This DC gain is also referred to herein as the DC gain of the semi-resonant voltage converter or loop gain. To shield the loop gain from instability, the gain of the linear controller 200 is reduced so that the loop gain, which includes the controller 200 and the converter 100, does not result in instability. In one embodiment, a PID linear control loop 202 is included in or associated with the linear controller 200. The term 'PID' is used herein, even if the derivative ('D') term is zero.

In one embodiment, the control circuit 112 compensates for an increase in the system gain magnitude by reducing the gain of the linear controller 200. This way, loop bandwidth dependency on load is decreased and enough phase margin is provided to maintain system stability. According to this embodiment, the output of the linear controller 200 is scaled downward by the term $S(I_O)$ e.g. via mixer/multiplier 204 responsive to the load current exceeding a first threshold, so as to at least partly counteract an increase in the DC gain of the system. Since the DC gain increases when the load increases, the scaling factor $S(I_O)$ shifts the gain down to compensate for this effect. The scaled output of the linear controller 200 is then converted to ON time (Ton) by multiplying the duty cycle by the immediately preceding measured switching period Tsw[k] e.g. via mixer/multiplier 206.

The output of the linear controller 200 is scaled by the term $S(I_O)$, which is based on measured or estimated load current. In one embodiment, the term $S(I_O)$ is implemented by a piecewise linear function as given by:

$$s(I_o) = \begin{cases} 1 & I_0 \ll I_{0_{th1}} \\ -\alpha_1(I_o - I_{0_{th1}}) + 1 & I_{0_{th1}} \ll I_0 < I_{0_{th2}} \\ -\alpha_2(I_o - I_{0_{th2}}) + S(I_{0_{th1}}) & I_{0_{th2}} \ll I_0 < I_{0_{th3}} \\ \vdots & \\ \alpha & I_0 > I_{0_{thn}} \end{cases} \quad (3)$$

Figure 4:
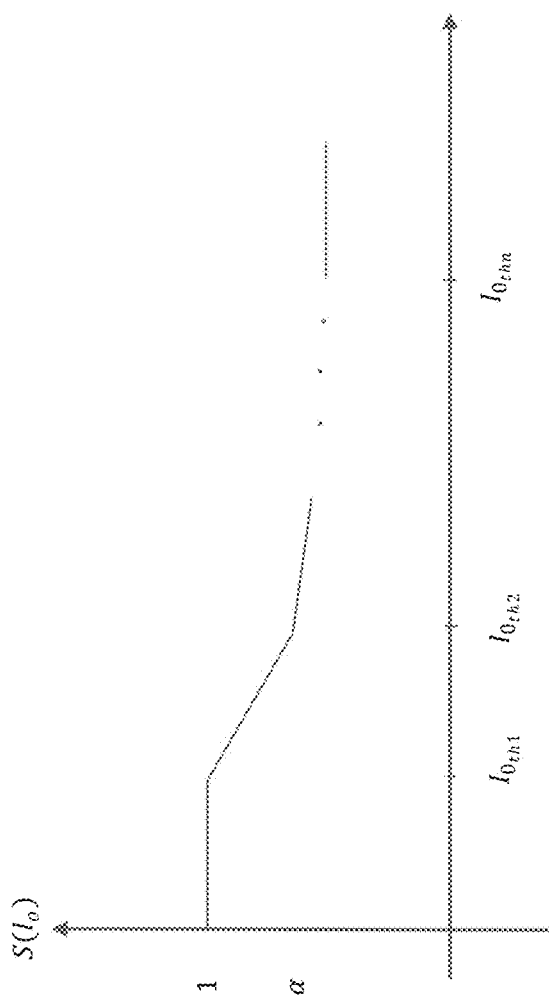
FIG. 4 illustrates a functional diagram of a piecewise linear function for scaling the controller output as a function of output current.

FIG. 4 illustrates an exemplary piecewise linear function. If the output (load) current $I_O$ remains below the first threshold $I_{Oth1}$, no scaling of the controller output is performed. The controller output is linearly downward scaled by $-\alpha_1(I_o - I_{0_{th1}}) + 1$ if the load current $I_O$ exceeds $I_{Oth1}$. One or more additional current thresholds can be employed, and the controller output can be scaled by different values $-\alpha_2(I_o - I_{0_{th2}}) + S(I_{0_{th1}})$, $\alpha$, etc. if the load current $I_O$ exceeds the corresponding threshold. As demonstrated in equation (3) and illustrated in FIG. 4, the output of the linear controller 200 can be linearly downward scaled at a second rate less than the first rate as the load current $I_O$ increases beyond the second threshold $I_{Oth2}$ toward a third threshold $I_{Oth3}$ greater than the second threshold $I_{Oth2}$. In another embodiment, only one threshold is employed and the output of the linear controller 200 is linearly downward scaled at the same uniform rate if the load $I_O$ current exceeds this threshold. Still other scaling techniques can be employed, each of which at least partly counteracts an increase in the DC gain of the system due to increasing load current.

As previously described herein, in addition to the DC gain of the system being a function of the load current, the duty cycle also is load dependent. The integrator output of a standard PID-based controller is a DC or constant value, and ideally should be near zero as the integral term is a correction for the nominal pulse width. The integrator is a slow moving function, and needs help during load changes/transient events. The integrator slowly acts on the error during transient events, and has nonnegligible inertia which can cause overshoot in the output voltage.

A standard feed-forward adjustment value $$n\frac{VOUT}{VIN}$$

is applied to the output of the linear controller 220 e.g. via an added/combiner 208, to assist the integrator in the case of a PID-based controller. The feed-forward adjustment value is designed to settle the integral term of the PID linear control loop 200 more quickly if the integral term begins to deviate from a nominal value. The gain from the duty cycle to the output is given by 1. Since the duty cycle is load dependent, applying $$n\frac{VOUT}{VIN}$$

will not center the integrator of the PID linear control loop 200 over a wide range of load current changes. This means that the integrator settles at different values during load transients, resulting in a tail in the voltage response. To mitigate this nonlinearity, the control circuit 112 applies a term $P(I_O)$ to the feed-forward adjustment value $$n\frac{VOUT}{VIN}$$

to help the integrator settle faster. $P(I_O)$ can be defined similar to $S(I_O)$, but with positive slope. That is, $S(I_O)$ is an attenuating function and $P(I_O)$ is an increasing function that helps the slowly adjusting feed-forward term to settle faster.

Figure 5:
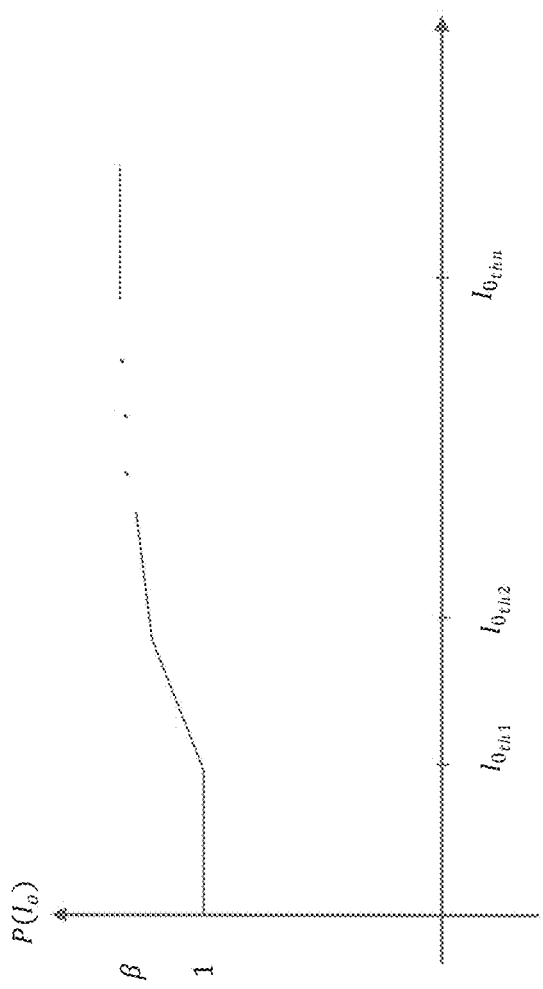
FIG. 5 illustrates a functional diagram of a piecewise linear function for scaling the feed-forward term of the control circuit as a function of output current.

FIG. 5 illustrates a piece wise linear function for the term $P(I_O)$. The term $P(I_O)$ scales upward the feed-forward adjustment value $$n\frac{VOUT}{VIN}$$

responsive to the load current exceeding a threshold, so as to force the integral term of the PID linear control loop 200 to settle faster. If the load current $I_O$ remains below the first threshold $I_{Oth1}$, no scaling of the feed-forward adjustment value $$n\frac{VOUT}{VIN}$$

is performed. The feed-forward adjustment value $$n\frac{VOUT}{VIN}$$

is linearly upward scaled e.g. by $-\beta_1(I_o-I_{0_{th1}})+1$ if the load current $I_O$ exceeds $I_{Oth1}$. The feed-forward adjustment value $$n\frac{VOUT}{VIN}$$

can be linearly upward scaled at a first rate as the load current $I_O$ increases beyond $I_{Oth1}$ toward a second, greater threshold $I_{Oth2}$, and linearly upward scales at a second rate less than the first rate as the load current $I_O$ increases beyond the second threshold $I_{Oth2}$ toward a third threshold $I_{Oth3}$ greater than the second threshold $I_{Oth2}$. In another embodiment, only one threshold is employed and the feed-forward adjustment value $$n\frac{VOUT}{VIN}$$

is linearly upward scaled at the same uniform rate if the load $I_O$ current exceeds this threshold. Still other scaling feed-forward techniques can be employed, each of which help the integral term of the PID linear control loop 200 settle faster. The feed-forward and controller output scaling techniques can use the same current thresholds or different thresholds. That is, $I_{Oth1}$, $I_{Oth2}$ and $I_{Othn}$ shown in FIG. 4 can be the same as or different than $I_{Oth1}$, $I_{Oth2}$ and $I_{Othn}$ in FIG. 5.

FIG. 2 illustrates yet another embodiment of helping the integrator of the PID linear control loop 200 to settle faster. According to this embodiment, integrator adjuster logic 210 included in or associated with the linear controller 200 adjusts the integrator directly during load transients. In one embodiment, the integrator adjuster logic 210, which can be part of the PID linear control loop 202, rescales the integral term of the PID linear control loop 200 responsive to the load current exceeding a threshold so as to force the integral term of the PID linear control loop 200 to settle more quickly to a nominal value. In another embodiment, the integrator adjuster logic 210 adjusts the gain of the integral term of the PID linear control loop 200 responsive to the load current exceeding a threshold so as to force the integral term of the PID linear control loop 200 to settle more quickly to the nominal value. In yet another embodiment, the integrator adjuster logic 210 is an offset integrator so that the linear controller 200 has two integral terms.

As previously described herein, in addition to the DC gain and duty cycle being a function of the load current, AVP (adaptive voltage positioning) bandwidth also is load dependent. The control circuit 112 includes an AVP unit 212. The AVP unit 212 computes the change $V_{AVP}$ in the converter set-point based on the target load line and the total output current $I_{SUM}$. The output $V_{AVP}$ of the AVP unit 210 is applied as an offset to the reference voltage $V_{REF}$ e.g. via an added/combiner 212. In general, the control circuit 112 can implement any standard AVP loop. AVP in the context of switching regulators is well known, and therefore no further explanation is given in this regard. The offset $V_{AVP}$ generated by the AVP unit 212 constitutes an error signal $V_{ERR}$ which is input to the linear controller 200.

Increases in the load current impart larger ripple on the system output, causing jitter and voltage ripple. In the semi-resonant converter topology illustrated in FIG. 1, as the output current $I_O$ increases, ripple increases which in turn causes the load line value voltage to have oscillations. The load line value voltage is a function of the total output current $I_{SUM}$ and effects the reference voltage $V_{REF}$.

In one embodiment, the term $A(I_O)$ is applied to the AVP unit 2121 for reducing the AVP bandwidth responsive to the load current $I_O$ exceeding a threshold, which in turn reduces oscillations in the output voltage $V_{OUT}$. As such, in response to higher current, the AVP bandwidth is reduced, resulting in less output ripple and lower AVP error. The AVP unit 212, which can be implemented as a digital filter, can have one or more poles which can be adjusted based on load. In one embodiment, a pole of the AVP filter is moved to a lower value based on the term $A(I_O)$ which is responsive to the load current exceeding a threshold. In another embodiment, the control circuit 112 selects a new pole value from a group of available pole values based on the load current as indicated by the term $A(I_O)$ and sets the pole of the AVP filter to the new pole value. In yet another embodiment, the control circuit 112 associates a first pole value with a threshold and associates a second pole value with a second, greater threshold. The control unit 112 interpolates between the first and second pole values as a function of the load current as indicated by the term $A(I_O)$, so as to identify a new pole value for the AVP filter. In each case, the control circuit 112 adjusts the AVP bandwidth based on the load and reduces the AVP bandwidth at higher load currents. The control circuit 112 can use the real ripple or the cycle average to generate the term $A(I_O)$ for adjusting the AVP bandwidth. Yet another option is for the control circuit 112 to use the peak current value which is proportional to the load current and is updated once per cycle.

Part 2: Controller Adaptation Based on System Bandwidth

As previously described herein, the linear controller 200 has a variable switching frequency Fsw and can be a PID controller with one or more poles. The converter 100 can also include a band stop filter 216 having a notch frequency.

Figure 6:
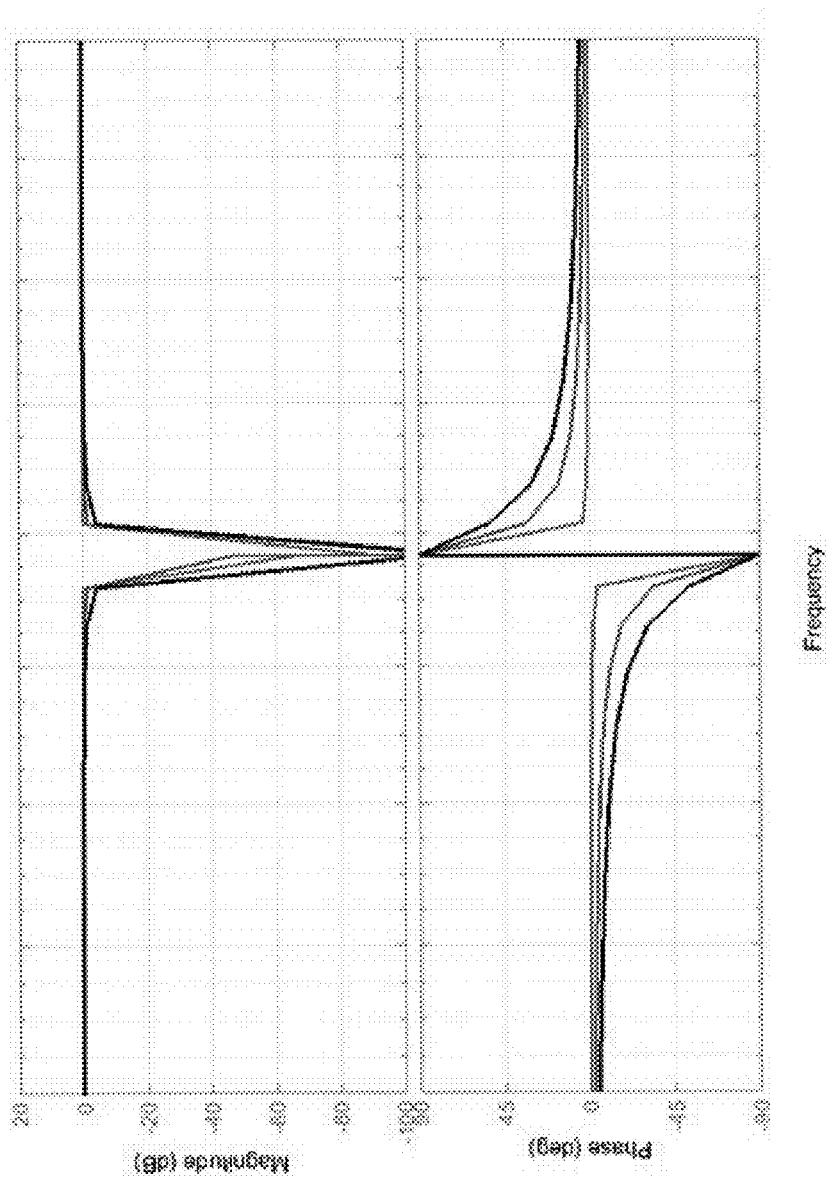
FIGS. 6 through 8 illustrate various magnitude and phase response waveforms associated with a band stop filter included in or associated with the control circuit.

FIG. 6 illustrates the magnitude and phase response of the band stop filter 216 with the same centre frequency or notch ($\omega_0$), but different Bandwidths. The band stop filter 216 attenuates the gain of the system at the frequencies inside its bandwidth (Wf) around the center frequency ($\omega_0$).

For illustrative purposes only, a standard PID controller with two extra poles can be implemented by:

$$PID = \left[\frac{K_i}{1-Z^{-1}} + K_p + K_d(1-z^{-1})\right] \quad (4)$$

$$\frac{K_{p1}}{1-(1-K_{p1})Z^{-1}} \times \frac{K_{p2}}{1-(1-K_{p2})Z^{-1}}$$

The band stop filter 216 can be added to a standard PID controller for rolling off the gain at about the switching frequency. The modified PID controller with such a band stop filter 216 can be implemented by:

$$PID^* = \left[\frac{K_i}{1-Z^{-1}} + K_p + K_d(1-z^{-1})\right]\frac{K_{p1}}{1-(1-K_{p1})Z^{-1}} \times H_{BS}(z^{-1}) \quad (5)$$

where $$H_{BS}(z^{-1}) = \frac{1+\alpha}{2} \cdot \frac{1-2\beta z^{-1} + Z^{-2}}{1-2\beta(1+\alpha)z^{-1} + \alpha z^{-2}}, \quad (6)$$

$$\alpha = \frac{1-\tan(BW_f/2)}{1+\tan(BW_f/2)}, \quad (7)$$

and $$\beta = \cos(\omega_0) \quad (8)$$

where $W_f$ is the bandwidth of the band stop filter 216, and $\omega_0$ is the notch or center frequency of the filter 216. The band stop filter 216 can be used with one pole from a standard PID control loop as given in equation 5.

FIG. 6 illustrates both the magnitude and phase response of the band stop filter 216 for different switching frequency bandwidths.

Figure 7:
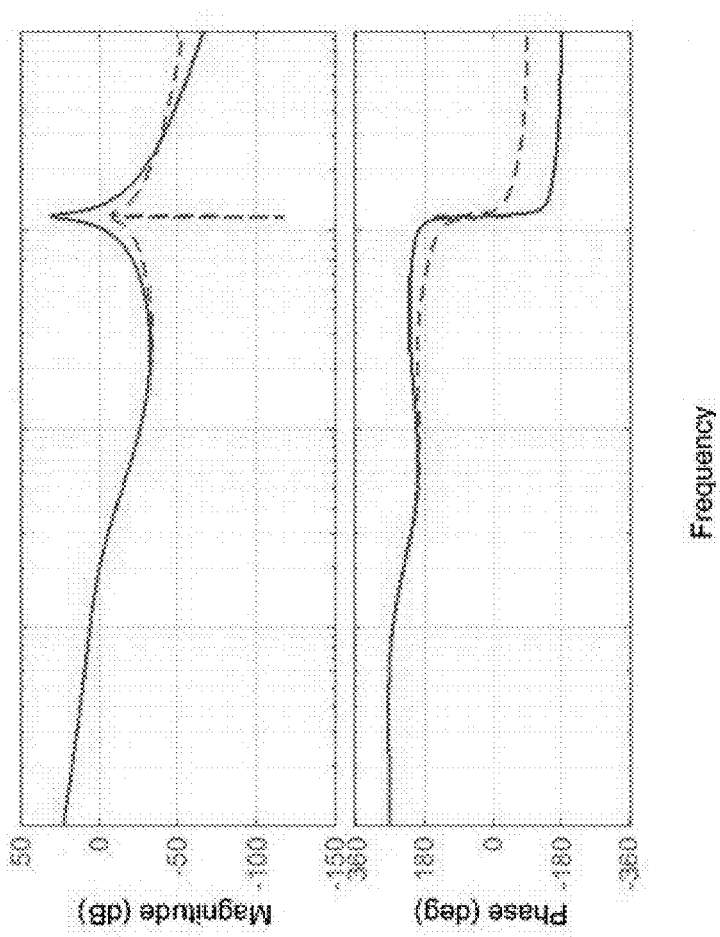

FIG. 7 illustrates both the magnitude and phase response of the PID-based controller 200 (solid line) overlaid with that of the band stop filter (dashed line). The PID controller 200 modified with the band stop filter 216 rolls off the gain at the switching frequency.

The band stop filter 216 allows for higher bandwidth at no load, compared to just the PID controller without the band stop filter 216. However, since the switching frequency is variable in the converter topology shown in FIG. 1, using a standard band stop filter with a fixed center frequency is not very effective. The control circuit 112 described herein adjusts the band stop filter 216 based on the load. The term $B(I_O)$ provided by the control circuit 112 ensures that the band stop filter bandwidth does not creep up as the output current $I_O$ or output voltage $V_{OUT}$ increases. The system gain is reduced at the switching frequency via the band stop filter 216. The control circuit 112, via the term $B(I_O)$, moves the notch frequency of the band stop filter 216 as a function of the load current or output voltage, so that the notch frequency tracks the switching frequency of the linear controller 200 as the switching frequency changes.

In one embodiment, the band stop filter 216 is overdesigned to accommodate a wide system bandwidth. In an adaptive embodiment, the control circuit 112 moves the notch frequency of the band stop filter 216 based on the output current $I_O$ or output voltage $V_{OUT}$. For example, a group of fixed filter response options may be available e.g. as a lookup table of filter responses, and the control circuit 112 picks a filter response based on the output current $I_O$ or output voltage $V_{OUT}$. In yet another embodiment, the notch frequency of the band stop filter 216 continuously moves with load current similar to the AVP approach. With the continuous approach, the control circuit 112 can interpolate between the filter response options stored in the lookup table based on the output current $I_O$ or output voltage $V_{OUT}$ to determine the notch frequency of the band stop filter 216.

Figure 8:
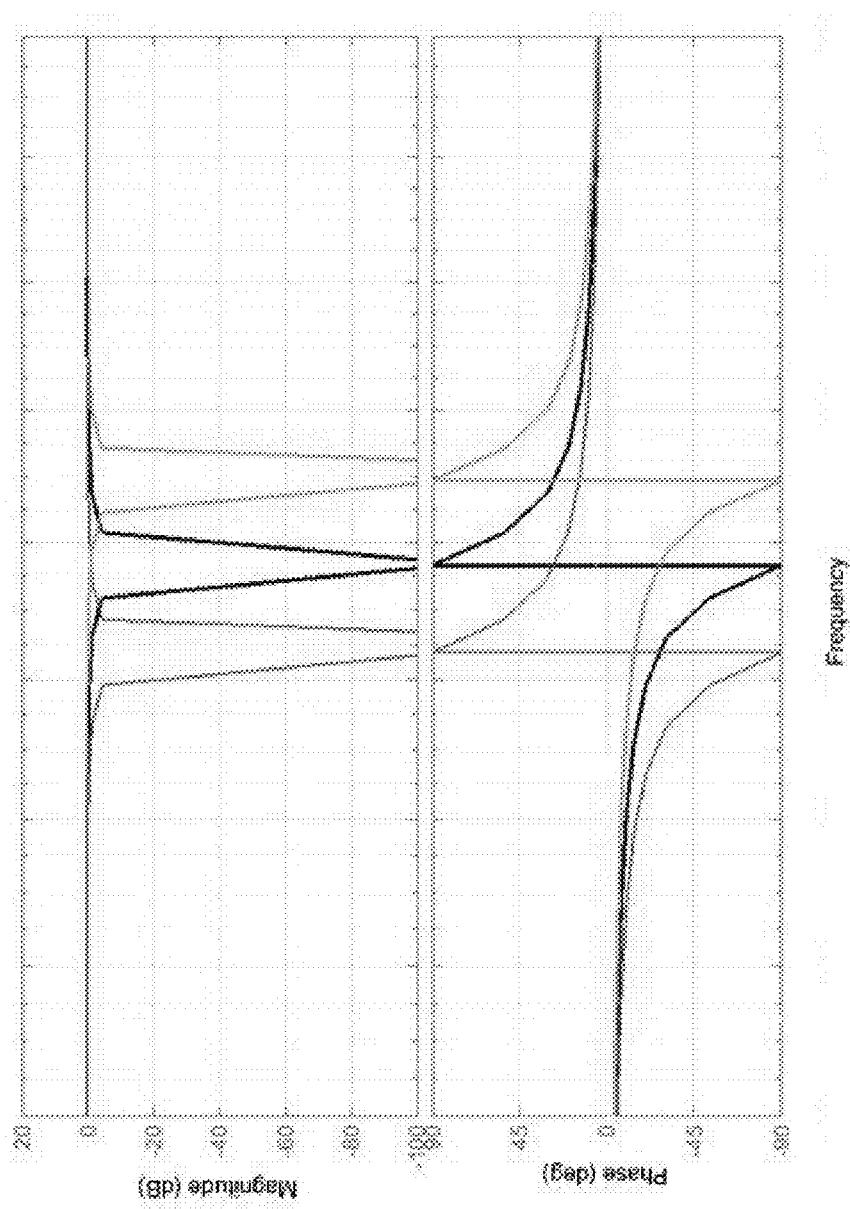

As illustrated in FIG. 8, there could be several choices for the notch frequency of the band stop filter 216 which can be selected based on the load conditions.

As previously explained above, the control adaptation techniques implemented by the control circuit 112 can be implemented individually, or in any combination unless explicitly prohibited against. The same or different thresholds can be used for the different embodiments.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of operating a semi-resonant voltage converter having a synchronous rectification (SR) switch through which a half-cycle sinusoidal-like current is conducted when turned on, the method comprising:
    switching the SR switch and other switches of the semi-resonant voltage converter via a linear controller so as to supply output power to a load, the semi-resonant voltage converter having a DC gain that increases when load current increases; and
    scaling downward an output of the linear controller used to control the switching of the SR switch responsive to the load current exceeding a first threshold, so as to at least partly counteract an increase in the DC gain of the semi-resonant voltage converter.

2. The method of claim 1, wherein scaling downward the output of the linear controller responsive to the load current exceeding the first threshold comprises:
    linearly downward scaling the output of the linear controller at a first rate as the load current increases beyond the first threshold toward a second threshold greater than the first threshold.

3. The method of claim 2, wherein scaling downward the output of the linear controller responsive to the load current exceeding the first threshold further comprises:
    linearly downward scaling the output of the linear controller at a second rate less than the first rate as the load current increases beyond the second threshold toward a third threshold greater than the second threshold.

4. The method of claim 1, wherein the linear controller includes a PID (proportional-integral-derivative) controller, the method further comprising:
applying a feed-forward adjustment value to the output of the linear controller, the feed-forward adjustment value designed to settle the integral term of the PID controller more quickly if the integral term begins to deviate from a nominal value; and
scaling upward the feed-forward adjustment value responsive to the load current exceeding the first threshold or another threshold, so as to force the integral term of the PID controller to settle faster.

5. The method of claim 4, wherein scaling upward the feed-forward adjustment value responsive to the load current exceeding the first threshold or another threshold comprises:
linear upward scaling the feed-forward adjustment value at a first rate as the load current increases beyond the first threshold or another threshold toward a second, greater threshold.

6. The method of claim 5, wherein scaling upward the feed-forward adjustment value responsive to the load current exceeding the first threshold or another threshold further comprises:
linearly upward scaling the feed-forward adjustment value at a second rate less than the first rate as the load current increases beyond the second threshold toward a third threshold greater than the second threshold.

7. The method of claim 1, wherein the linear controller includes a PID (proportional-integral-derivative) controller, the method further comprising:
resealing the integral term of the PID controller responsive to the load current exceeding the first threshold or another threshold, so as to force the integral term of the PID controller to settle more quickly to a nominal value.

8. The method of claim 7, wherein resealing the integral term of the PID controller responsive to the load current exceeding the first threshold or another threshold comprises:
adjusting a gain of the integral term of the PID controller responsive to the load current exceeding the first threshold or another threshold, so as to force the integral term of the PID controller to settle more quickly to the nominal value.

9. The method of claim 1, wherein the linear controller comprises an adaptive voltage positioning (AVP) filter for providing output voltage droop compensation, the method further comprising:
reducing a bandwidth of the AVP filter responsive to the load current exceeding the first threshold or another threshold, so as to reduce oscillations in the output voltage.

10. The method of claim 9, wherein reducing the bandwidth of the AVP filter responsive to the load current exceeding the first threshold or another threshold comprises:
moving a pole of the AVP filter to a lower value responsive to the load current exceeding the first threshold or another threshold.

11. The method of claim 10, wherein moving the pole of the AVP filter to the lower value responsive to the load current exceeding the first threshold or another threshold comprises:
selecting a new pole value from a group of available pole values based on the load current; and
setting the pole of the AVP filter to the new pole value.

12. The method of claim 10, wherein moving the pole of the AVP filter to a lower value responsive to the load current exceeding the first threshold or another threshold comprises:
associating a first pole value with the first threshold or another threshold;
associating a second pole value with a second, greater threshold; and
interpolating between the first and second pole values as a function of the load current so as to identify a new pole value for the AVP filter.

13. The method of claim 1, wherein the linear controller has a variable switching frequency and includes a PID (proportional-integral-derivative) controller with one or more poles and a band stop filter having a notch frequency corresponding to the one or more poles of the PID controller, the method further comprising:
reducing the gain of the semi-resonant voltage converter at the switching frequency via the band stop filter; and
moving the notch frequency of the band stop filter as a function of the load current or output voltage, so that the notch frequency tracks the switching frequency of the linear controller as the switching frequency changes.

14. A method of operating a semi-resonant voltage converter having a synchronous rectification (SR) switch through which a half-cycle sinusoidal-like current is conducted when turned on, the method comprising:
controlling switching of the SR switch via an output of a PID (proportional-integral-derivative) controller so as to supply output power to a load;
applying a feed-forward adjustment value to the output of the PID controller, the feed-forward adjustment value designed to settle the integral term of the PID controller if the integral term begins to deviate from a nominal value; and
scaling upward the feed-forward adjustment value responsive to the load current exceeding the first threshold or another threshold, so as to force the integral term of the PID controller to settle faster.

15. The method of claim 14, wherein scaling upward the feed-forward adjustment value responsive to the load current exceeding the first threshold or another threshold comprises:
linearly upward scaling the feed-forward adjustment value at a first rate as the load current increases beyond the first threshold or another threshold toward a second, greater threshold.

16. The method of claim 15, wherein scaling upward the feed-forward adjustment value responsive to the load current exceeding the first threshold or another threshold further comprises:
linearly upward scaling the feed-forward adjustment value at a second rate less than the first rate as the load current increases beyond the second threshold toward a third threshold greater than the second threshold.

17. A method of operating a semi-resonant voltage converter having a synchronous rectification (SR) switch through which a half-cycle sinusoidal-like current is conducted when turned on, the method comprising:
switching the SR switch and other switches of the semi-resonant voltage converter via a linear controller so as to supply output power to a load, the linear controller comprising an adaptive voltage positioning (AVP) filter for providing output voltage droop compensation; and
reducing a bandwidth of the AVP filter responsive to the load current exceeding the first threshold or another threshold, so as to reduce oscillations in the output voltage.

18. The method of claim 17, wherein reducing the bandwidth of the AVP filter responsive to the load current exceeding the first threshold or another threshold comprises:

moving a pole of the AVP filter to a lower value responsive to the load current exceeding the first threshold or another threshold.

19. The method of claim 18, wherein moving the pole of the AVP filter to the lower value responsive to the load current exceeding the first threshold or another threshold comprises:
   selecting a new pole value from a group of available pole values based on the load current; and
   setting the pole of the AVP filter to the new pole value.

20. The method of claim 18, wherein moving the pole of the AVP filter to a lower value responsive to the load current exceeding the first threshold or another threshold comprises:
   associating a first pole value with the first threshold or another threshold;
   associating a second pole value with a second, greater threshold; and
   interpolating between the first and second pole values as a function of the load current so as to identify a new pole value for the AVP filter.

* * * * *